(12) United States Patent
Shivaram et al.

(10) Patent No.: US 10,290,118 B2
(45) Date of Patent: May 14, 2019

(54) SYSTEM AND METHOD FOR TYING TOGETHER MACHINE VISION COORDINATE SPACES IN A GUIDED ASSEMBLY ENVIRONMENT

(71) Applicant: Cognex Corporation, Natick, MA (US)

(72) Inventors: Guruprasad Shivaram, Wellesley, MA (US); Cyril C. Marrion, Jr., Acton, MA (US); Lifeng Liu, Arlington, MA (US); Tuotuo Li, Newton, MA (US)

(73) Assignee: COGNEX CORPORATION, Natick, MA (US)

( * ) Notice: Subject to any disclaimer, the term of this patent is extended or adjusted under 35 U.S.C. 154(b) by 66 days.

(21) Appl. No.: 15/223,436

(22) Filed: Jul. 29, 2016

(65) Prior Publication Data

US 2017/0132807 A1    May 11, 2017

Related U.S. Application Data

(60) Provisional application No. 62/201,723, filed on Aug. 6, 2015.

(51) Int. Cl.
*G06T 7/80* (2017.01)
*B25J 9/16* (2006.01)
(Continued)

(52) U.S. Cl.
CPC .............. *G06T 7/80* (2017.01); *B25J 9/1692* (2013.01); *B25J 9/1697* (2013.01);
(Continued)

(58) Field of Classification Search
CPC .. G06T 7/80; G06T 7/74; G06T 7/344; G06T 7/337; B25J 9/1697; G06K 9/4604; H04N 5/247
See application file for complete search history.

(56) References Cited

U.S. PATENT DOCUMENTS 4,380,696 A * 4/1983 Masaki ................. B25J 19/023
                                                 219/124.34
4,568,816 A * 2/1986 Casler, Jr. .......... G05B 19/4083
                                                 219/124.34
(Continued)

FOREIGN PATENT DOCUMENTS

CN         101149836 A        3/2008
CN         102922521 A        2/2013
(Continued)

*Primary Examiner* — Mia M Thomas
(74) *Attorney, Agent, or Firm* — Loginov IP

(57) ABSTRACT

This invention provides a system and method that ties the coordinate spaces at the two locations together during calibration time using features on a runtime workpiece instead of a calibration target. Three possible scenarios are contemplated: wherein the same workpiece features are imaged and identified at both locations; wherein the imaged features of the runtime workpiece differ at each location (with a CAD or measured workpiece rendition available); and wherein the first location containing a motion stage has been calibrated to the motion stage using hand-eye calibration and the second location is hand-eye calibrated to the same motion stage by transferring the runtime part back and forth between locations. Illustratively, the quality of the first two techniques can be improved by running multiple runtime workpieces each with a different pose, extracting and accumulating such features at each location; and then using the accumulated features to tie the two coordinate spaces.

20 Claims, 7 Drawing Sheets

(51) Int. Cl.
  *G06T 7/73* (2017.01)
  *G06T 7/33* (2017.01)
  *G06K 9/46* (2006.01)
  *H04N 5/247* (2006.01)

(52) U.S. Cl.
  CPC ............ *G06K 9/4604* (2013.01); *G06T 7/337* (2017.01); *G06T 7/344* (2017.01); *G06T 7/74* (2017.01); *H04N 5/247* (2013.01); *G05B 2219/39039* (2013.01); *G06T 2207/30164* (2013.01); *Y10S 901/47* (2013.01)

(56) References Cited

U.S. PATENT DOCUMENTS

| | | | |
|---|---|---|---|
| 4,655,596 A * | 4/1987 | Blessing | A41H 43/0271 356/615 |
| 4,731,860 A | 3/1988 | Wahl | |
| 4,841,460 A | 6/1989 | Dewar et al. | |
| 4,845,639 A | 7/1989 | Stern et al. | |
| 4,959,898 A | 10/1990 | Landman et al. | |
| 5,547,537 A | 8/1996 | Reynolds et al. | |
| 5,933,523 A | 8/1999 | Drisko et al. | |
| 5,960,125 A | 9/1999 | Michael | |
| 6,078,846 A | 6/2000 | Greer et al. | |
| 6,419,680 B1 | 7/2002 | Cosman et al. | |
| 6,437,287 B1 * | 8/2002 | Offerhaus | B23K 26/032 219/121.6 |
| 6,466,841 B2 * | 10/2002 | DiStasio | B25J 9/1697 700/213 |
| 6,493,574 B1 | 12/2002 | Ehnholm et al. | |
| 6,819,789 B1 | 11/2004 | Kantor et al. | |
| 6,901,673 B1 | 6/2005 | Cobb et al. | |
| 6,950,548 B1 | 9/2005 | Bachelder et al. | |
| 7,271,377 B2 | 9/2007 | Mueller et al. | |
| 8,248,620 B2 | 8/2012 | Wicks et al. | |
| 8,368,762 B1 | 2/2013 | Chen et al. | |
| 8,509,949 B2 | 8/2013 | Bordyn et al. | |
| 9,021,344 B2 | 4/2015 | Thomas et al. | |
| 9,131,121 B2 * | 9/2015 | Matsudo | H04N 7/18 |
| 9,305,231 B2 | 4/2016 | Marrion et al. | |
| 2002/0111709 A1 * | 8/2002 | DiStasio | B25J 9/1697 700/213 |
| 2005/0213807 A1 * | 9/2005 | Wasserman | G06T 7/0004 382/152 |
| 2006/0241432 A1 | 10/2006 | Herline et al. | |
| 2009/0098667 A1 | 4/2009 | Behler et al. | |
| 2011/0157373 A1 * | 6/2011 | Ye | G06T 7/85 348/187 |
| 2011/0157577 A1 * | 6/2011 | Dohse | G03F 7/70791 355/72 |
| 2011/0280472 A1 | 11/2011 | Wallack et al. | |
| 2013/0010081 A1 | 1/2013 | Tenney et al. | |
| 2013/0321636 A1 * | 12/2013 | Matsudo | H04N 7/18 348/152 |
| 2014/0012416 A1 | 1/2014 | Negishi et al. | |
| 2014/0240520 A1 | 8/2014 | Liu et al. | |
| 2014/0267681 A1 | 9/2014 | Liu et al. | |
| 2014/0365061 A1 | 12/2014 | Vasquez et al. | |
| 2015/0142171 A1 | 5/2015 | Li et al. | |
| 2015/0375396 A1 | 12/2015 | Shirakyan et al. | |
| 2017/0024613 A1 * | 1/2017 | Shivaram | G06K 9/00671 |
| 2017/0236262 A1 * | 8/2017 | Ohnuki | G06T 7/74 700/30 |
| 2018/0050452 A1 * | 2/2018 | Ou | B25J 9/1697 |

FOREIGN PATENT DOCUMENTS

| | | |
|---|---|---|
| CN | 104268876 A | 1/2015 |
| CN | 104625268 A | 5/2015 |
| CN | 104819690 A | 8/2015 |
| DE | 112011101730 B4 | 3/2016 |
| DE | 112010005008 | 9/2018 |
| JP | H08201021 | 8/1996 |
| JP | 2001284899 A | 10/2001 |
| JP | 2010-541293 A | 12/2010 |
| WO | 2009047214 A2 | 4/2009 |

\* cited by examiner

SYSTEM AND METHOD FOR TYING TOGETHER MACHINE VISION COORDINATE SPACES IN A GUIDED ASSEMBLY ENVIRONMENT

RELATED APPLICATION

This application claims the benefit of U.S. Provisional Application Ser. No. 62/201,723, entitled SYSTEM AND METHOD FOR TYING TOGETHER MACHINE VISION COORDINATE SPACES IN A GUIDED ASSEMBLY ENVIRONMENT, filed Aug. 6, 2015, the teachings of which are expressly incorporated in by reference.

FIELD OF THE INVENTION

This invention relates to machine vision systems, and more particularly to vision systems used to guide the assembly of workpieces and other objects in a manufacturing and guided assembly environment.

BACKGROUND OF THE INVENTION

In machine vision systems (also termed herein "vision systems"), one or more cameras are used to perform vision system process on an object or surface within an imaged scene. These processes can include inspection, decoding of symbology, alignment and a variety of other automated tasks. More particularly, a vision system can be used to inspect a flat object passing through an imaged scene. The scene is typically imaged by one or more vision system cameras that can include internal or external vision system processors that operate associated vision system processes to generate results. One or more of the cameras are calibrated to enable it/them to perform the vision task(s) with sufficient accuracy and reliability. A calibration plate can be employed to calibrate the camera(s), and establish a common (global) coordinate space (also referred to as a coordinate "system") in which the pixel locations of all cameras are mapped to associated points in the coordinate space, thereby allowing an imaged feature in any camera to be located within the coordinate space. In applications that use a motion stage for guiding the assembly of objects the calibration process can include establishing a relationship between the motion stage (also termed a "motion coordinate space") and the common coordinate space. Such calibration can be achieved using known "hand-eye" calibration techniques.

A notable task for vision systems is to assist in guiding and verifying the assembly of objects (also termed "workpieces") by an automated assembly mechanism that can include moving platforms (motion stages) to accurately support a workpiece at an assembly location and a manipulator (e.g. a robot hand or arm that performs a "pick-and-place" operations or another type of motion device/motion stage) to move another workpiece in an "assembly motion" to an overlying alignment location where it is assembled to the workpiece. A particular pick and place operation involves aligning one workpiece with another workpiece. For example, a touch screen can be manipulated by the manipulator over and into a well on a cell phone residing on the motion stage in the pick-and-place operation, where each touch screen is moved from the pick location and deposited at the place location (sometimes termed a "station") on a waiting cell phone body. Proper and accurate alignment of the touch screen with cellphone body is highly desirable.

Some exemplary systems are initially trained so that each workpiece is in correct alignment with the other workpiece during runtime operation of the system. During train time, the workpieces are positioned at their respective locations/stations so that, when assembled, the assembled workpieces have a desired mutual positional relationship. Following training, during runtime, one or both of the workpieces are repositioned in their respective locations by use of the vision system in control of the associated motion stage at the location, in order to account for any placement or dimensional variation, and then assembled. By adjusting the stage, the workpieces are thereby placed in same mutual (expected) positional relationship as they were at train time. In other exemplary systems, training can be omitted—for example systems where the geometry of the assembled parts can be employed during runtime, such as where a first rectangular object is being centered on a second rectangular object.

Following imaging of the scene with workpieces, features belonging to each workpiece are extracted and mapped to the common coordinate space as part of a process that eventually computes the stage motion parameters that would result in the desired assembly. The mapping to the common coordinate space is due to a calibration process. On many assembly systems, the calibration process includes transferring a special calibration target between locations using the repeatable manipulator that transfers the part and imaging a calibration target at both the locations. This technique has several disadvantages. For example, the pick-and-place gripper that transfers the part may not be able to transfer a calibration target, due to differences in the shape, weight or other characteristics of the workpiece versus the calibration target. That is, a calibration target does not fit the parameters of the gripper. In such systems, the mapping of parameters to the common coordinate space must be specified manually via user input, which often results in sub-optimal calibration. In addition, the motion path followed by the pick-and-place manipulator during calibration versus runtime may differ due to differences in the characteristics of the part and the calibration target, such as differences in thickness or other characteristics. This can introduce calibration errors as it requires variation from the runtime motion steps taken by the manipulator versus the training time motion steps. More generally, it is a further inconvenience for a user to employ a separate calibration target during calibration time due to additional setup steps, etc.

Also disadvantageously, prior techniques for calibrating have relied on certain mechanical or/or iterative trial and error principles that have limitations and/or are inconvenient and time-consuming to implement. For example, in one technique the mechanical system can be constructed so that the relationship between the coordinate space at the first location and the coordinate space at the second location is known and established. This technique limits flexibility and does not account for possible movement or change in position over time. In another technique, an initial estimate of the relationship between the two locations is made and is repeatedly refined by using the quality of the assembled parts. This technique is time consuming and relies upon multiple iterations to achieve desired accuracy.

SUMMARY OF THE INVENTION

This invention overcomes disadvantages of the prior art related to problems that arise from transferring a calibration target by the manipulator (and associated gripper) between pick and place locations, by providing a system and method for calibration that ties the coordinate spaces at the two locations together during calibration time using features on a runtime workpiece. This system and method accommodates at least three different scenarios/techniques—one in which the same features can be imaged and identified at both locations; one in which the imaged features of the runtime workpiece differ at each location (wherein a CAD or measured rendition of the workpiece is available); and one in which the first location containing a motion stage has been calibrated to the motion stage using hand-eye calibration and the second location is hand-eye calibrated to the same motion stage by transferring the runtime part back and forth between locations. Illustratively, the quality of the first two techniques can be improved by running multiple runtime workpieces each with a different pose, extracting the features and accumulating such features at each location; and then using the accumulated features to tie the two coordinate spaces. More generally, the system and method independently calibrates the two locations and ties the coordinate spaces for the two locations together by transferring a workpiece that the manipulator is constructed and arranged/adapted to transfer during assembly and using that workpiece's features instead of using the features of a calibration plate.

In an illustrative embodiment, a system and method for calibrating a vision system in an environment in which a first workpiece at a first location is transferred by a manipulator to a second location is provided. An operation is performed on the first workpiece, which relies upon tying together coordinate spaces of the first location and the second location. At least one vision system camera is arranged to image the first workpiece when positioned at the first location and to image the first workpiece when positioned at the second location. At least one vision system camera is calibrated with respect to the first location to derive first calibration data which defines a first coordinate space and at least one vision system camera (potentially the same camera(s)) is calibrated with respect to the second location to derive second calibration data which defines a second coordinate space. The features of at least the first workpiece are identified at the first location from a first image of the first workpiece. Based on the identified features in the first image the first workpiece is located with respect to the first coordinate space relative to the first location. The first workpiece is gripped and moved, with the manipulator, at least one time, to a predetermined manipulator position at the second location and a second image of the first workpiece is acquired at the second location. Based upon the identified features in the second image, the first workpiece is located with respect to the second coordinate space relative to the second location. The first coordinate space and the second coordinate space are thereby tied together. Illustratively, where the identified features in the first image are the same as the identified features in the second image, the system and method includes: (a) mapping locations of the identified features in the first image with respect to the first calibration data, (b) mapping locations of the identified features in the second image with respect to the second calibration data, and (c) computing a transform mapping the mapped features at the second location to the mapped features at the first location. Alternatively, where some of the identified features in the first image differ from the identified features in the second image, the system and method includes: (a) mapping locations of the identified features in the first image with respect to the first calibration data, (b) computing a transform relative to a stored specification of feature locations of the first workpiece, (c) mapping locations of the identified features in the second image with respect to the second calibration data, (d) using the transform computed in step (b) to derive locations of the identified features from the second image in the first coordinate space when the workpiece is located at the first location, and (e) computing a transform mapping the mapped features at the second location to the corresponding transformed features at the first location. The specification of the first workpiece can be based upon a CAD model of the first workpiece or a measured model (e.g. CMM-generated measurements) of the first workpiece. Illustratively, the system and method can include: (a) moving the first workpiece iteratively with a motion rendering device at either the first location or the second location to a plurality of different poses, (b) identifying features at each of the poses at each of the first location and the second location and (c) accumulating the identified feature information to enhance accuracy, wherein the first workpiece is either the same workpiece or is one of a plurality of discrete workpieces. In various embodiments, the system and method includes a mapping from an image coordinate system to a calibration coordinate system at the first location, and wherein the mapping is unity. In embodiments, the second location has a second workpiece into which the first workpiece is placed into engagement in a desired alignment with the second workpiece, and/or the second workpiece can be a part, a container or a framework for further processing of the first workpiece. Additionally, in various embodiments, the operation can be at least one of an alignment operation with respect to another object, a printing operation on the first workpiece, and an application operation on the first workpiece, and the operation can be performed at least in part at a location remote from the first location and the second location.

In another illustrative embodiment, a system and method for calibrating a vision system in an environment in which a first workpiece at a first location is transferred by a manipulator to a second location, wherein an operation performed on the first workpiece relies upon tying together coordinate spaces of the first location and the second location is provided, and in which at least one of the locations is subject to hand-eye calibration. At least one vision system camera is arranged to image the first workpiece at the first location and to image the second location. The vision system camera is hand-eye calibrated with respect to the first location to derive first calibration data, and the first workpiece is positioned at the first location. Illustratively, the first workpiece is moved by the manipulator from the first location to the second location, and an image is acquired, from which features on the first workpiece are located. The first workpiece is then moved by the manipulator to the first location from the second location, and a pose of the first workpiece is changed at the first location by moving the motion rendering device to a new known pose. The motion rendering device can be located at either location and the pose-change via the motion rendering device can occur either before or after movement by the manipulator from the second to first location.

The above steps are iterated until feature location and other data relevant to hand-eye calibration is accumulated and stored, and then the accumulated data is used to hand-eye calibrate at least one vision system camera with respect to the second location. This allows tying together the first coordinate space and the second coordinate space by the common coordinate space relative to the motion rendering device obtained from the hand-eye calibration. Illustratively, the second location has a second workpiece on the motion rendering device into which the first workpiece is placed into engagement in a desired alignment with the second workpiece. The second workpiece can be a part, a container or a framework for further processing of the first workpiece, and the operation can be at least one of an alignment operation with respect to another object, a printing operation on the first workpiece, and an application operation on the first workpiece.

BRIEF DESCRIPTION OF THE DRAWINGS

The invention description below refers to the accompanying drawings, of which.

DETAILED DESCRIPTION

Figure 1:
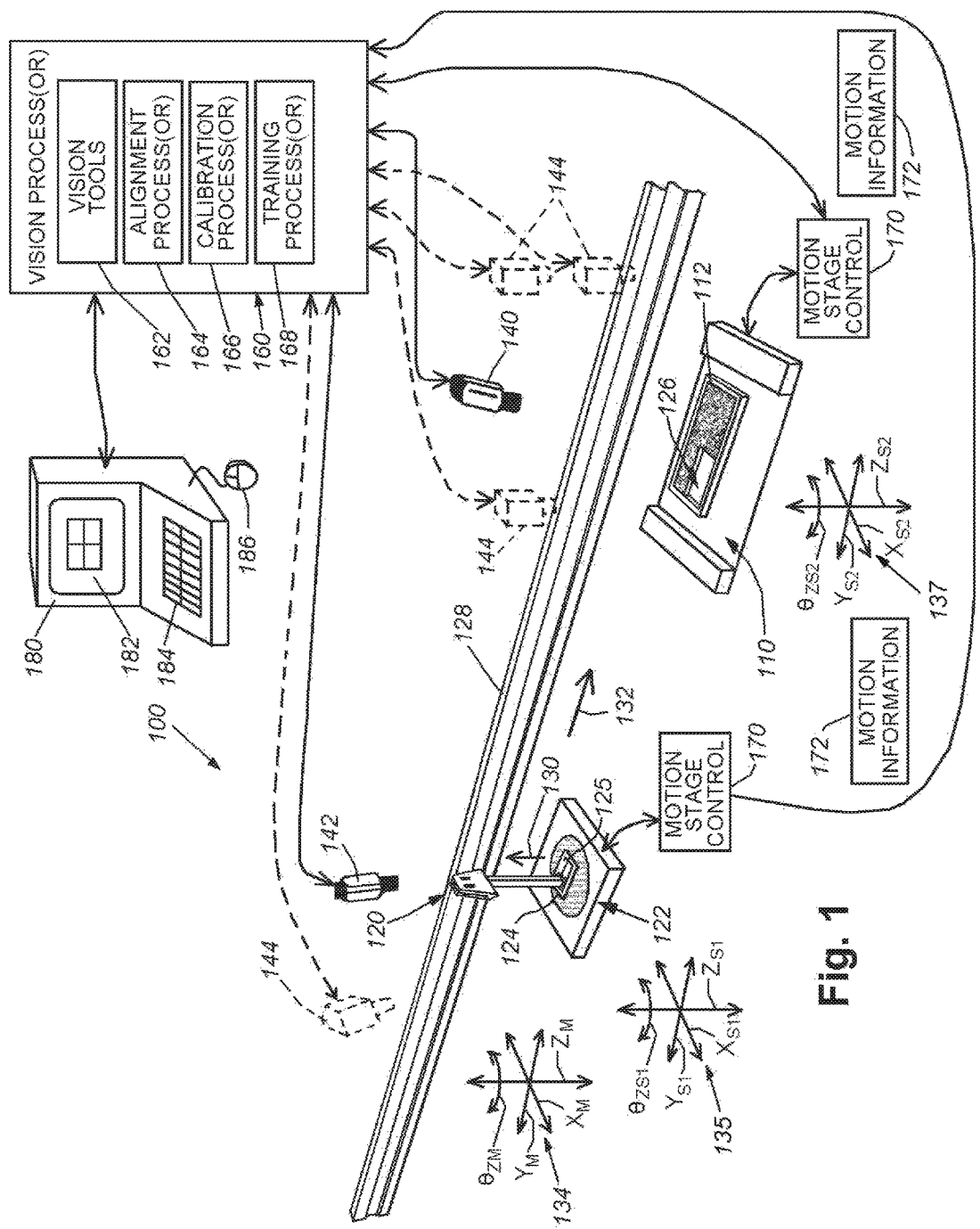
FIG. 1 is a diagram of a multi-camera vision system arranged with respect to an exemplary pick-and-place assembly environment, showing a pick-and-place manipulator located at the pick location to extract a workpiece for transport to a place location, in which one of the locations includes an exemplary motion stage used in conjunction with a workpiece assembly system, and a vision processor with associated tools and processes for calibration, training and runtime operation.

FIG. 1 illustrates an assembly system 100 with an exemplary pick-and-place (manipulator) mechanism 120 that can employ the system and method for calibrating using an object (first workpiece) that is manipulated (transferred between locations/stations) by the manipulator in runtime operation for assembly to a second workpiece at a second location, according to an embodiment. The locations particularly include a pick location 122, where the runtime workpiece-to-be-transferred 124 is initially located and a place location 110, where a second workpiece 112, to which the first workpiece 124 is assembled, is located. The manipulator can include a gripper that can comprise (e.g.) a suction cup 125 for selectively engaging the first workpiece 124.

The manipulator 120 selectively picks up (arrow 130) and transfers (arrow 132) the first workpiece 124 to an alignment position 126 on the second workpiece 112. In this example, a rail 128 is provided to guide the manipulator 120 along a repeatable path. This rail is optional, and any modality that allows for repeatable motion of the manipulator 120 between pick and place locations is expressly contemplated. By way of illustration, the manipulator defines a coordinate space 134 characterized by axes Xm, Ym and Zm in which the manipulator 120 moves along at least the axis Ym, and along a pick/place direction in the axis Zm. Rotation θzm about the axis Zm is also shown, but may or may not be performed by the manipulator. The motions performed by the manipulator are arbitrary and the vision system generally operates independently of such motions, which are shown by way of illustration.

The pick location 122 and/or place location 110 each define a platform onto which respective workpieces 124 and 112 are positioned prior to a pick/place operation. The workpieces 124, 112 can be deposited on the locations/platforms (122, 110, respectively) by any acceptable technique—e.g. a conveyor from a source of workpieces, robot manipulator, manual placement by a user, etc. In other embodiments, the workpiece 124 can be held by the manipulator at the first location 110, and is not deposited on the location/platform 122. In the exemplary system, Either one of the locations/platforms 122, 110 can comprise a motion stage that moves in one or more degrees of freedom with desired accuracy. Such stage motion is provided to establish alignment between workpieces prior to or after the repeatable pick and place motion. That is, one of the workpieces is pre-aligned by the motion stage, and then the pick/place operation maintains the predetermined alignment as it moves through the defined path. Alternatively, after the pick/place operation moves the workpiece, the final alignment of the workpieces can occur just prior to the assembly/place motion. Each platform (either of which can include a motion stage) defines its own coordinate space, which can be considered the location's local, calibrated coordinate space. That is, the pick platform 122 defines a first coordinate space Xs1, Ys1, Zs1 (orthogonal axes 135), and the place platform 110 defines a second coordinate space Xs2, Ys2, Zs2 (orthogonal axes 137). Where either platform includes a motion stage, such motion can occur along one or more of the depicted coordinate axes and, optionally, in at least one rotational degree of freedom (i.e. along θzs1 or θzs2 as depicted).

In this exemplary system environment/arrangement 100, at least one camera 142, 140 respectively images each location (122, 110). Alternatively, a single camera or multiple cameras can image both locations in a single field of view (FOV). In general, and as described herein, it is contemplated that the same or different features of the workpiece are visible to one or more cameras at each location as the workpiece is positioned at that location. The cameras 140, 142 are interconnected to a vision process(or) 160. One or both locations 122, 110 can optionally include additional cameras 144 (shown in phantom). The vision process(or) 160 is also operatively interconnected to a stage motion controller 170 at the associated location that provide motion information (e.g. encoder or stepper distance/pulse information) 172 to the processor 160 for use in determining physical position of the stage and associated workpiece. Since the motion stage can be located optionally at either location 122 or 110, the controller 170 and associated motion information 172 is depicted similarly for both locations. During hand-eye calibration (described further below), the stage is moved while motion information is recorded and correlated with the acquired image(s).

The cameras 140, 142, 144 are each operatively connected to the vision system processor and associated vision system process 160 that can be integrated as a custom vision processor circuit within one or more camera housing(s), in whole or in part, or can be provided within an interconnected, computing device 180, including but not limited to, a PC, laptop, tablet, smartphone, or the like having an appropriate graphical user interface (GUI—e.g. display and/or touchscreen 182, keyboard 184, and/or mouse 186) to assist with setup (calibration), training, and/or runtime operation. Note that in assembly systems employing more than one camera, each camera is adapted to send either its acquired image or information extracted from that image to a central processor. The central processor then integrates the information from the various cameras during assembly. The vision process(or) 160 performs a variety of vision system processes (or elements/modules) including various vision tools 162, such as edge finders, blob analyzers, search tools, caliper tools, etc. Illustratively, the vision process(or) 160 includes an alignment process(or) 164 that carries out alignment of image data from the two workpieces in a manner described further below. A calibration process(or) 166 facilitates performing camera calibrations and hand-eye calibrations further described below. Illustratively, a training process(or) 168 carries out the various training procedures contemplated herein to reposition the workpieces so as to accurately assemble the second workpiece relative to the first workpiece. Note that the vision processor 160 can be established as a plurality of interconnected camera processors (or other devices), or a central processor in a single camera assembly (or remote computing device).

Note also that the physical workpiece assembly arrangement depicted in various embodiments herein contains an arbitrary number of cameras that image various regions of the platform/motion stage. The number of cameras used in imaging each location (and/or the overall assembly environment) is highly variable in alternate arrangements. Likewise, the number of locations within the overall system at which the manipulator performs a task is highly variable.

In addition, it should be clear that the depicted assembly environment is exemplary of a variety of arrangements in which a first workpiece is transferred by a (e.g.) repeatable manipulator from a first location to another location in which an operation is performed upon the first workpiece. The operation can include engagement with a second workpiece in a desired alignment or can be performed directly upon the first workpiece using an appropriate mechanism. For example, a second workpiece can be a part, to which the first workpiece is assembled, a container/box into which the first workpiece is placed and/or a framework into which the first workpiece is places—for example as part of a kitting arrangement. The in addition to such placement, the operation can also include printing or applying decals to the first workpiece, exposing it to a laser, cutter, tool head or other device and/or any other process that modifies the workpiece. Further definitions for the operation and second workpiece are provided below. In general, it is contemplated mainly that the system and method allows for tying the coordinate spaces of the camera(s) imaging the first location and the second location together to enable an operation to occur in a desirable manner.

Before describing further the details of the illustrative system and method, reference is made to the following definitions, which should assist the reader in understanding the concepts presented herein:

| | Definitions |
|---|---|
| "Calibrated Coordinate Space" | A coordinate space defined by the calibration target used during a camera calibration, hand-eye calibration, or other calibration process. |
| "Common Coordinate Space" | At runtime, features acquired by the cameras in the system are mapped to this space. The common coordinate space is shared across locations. |
| "Image Coordinate Space" | The coordinate space of an acquired image or the coordinate space of a transformed image. |
| "Motion Coordinate Space" | The native coordinate space associated with the motion rendering device (e.g. motion stage). |
| "Workpiece Coordinate Space" | The coordinate space associated with a workpiece. Possible sources of this coordinate space are a CAD specification or CMM rendition of the workpiece. |
| "CalibratedFromImage Transform" | The transform that maps points from the Image Coordinate Space to the Calibrated Coordinate Space. |
| "Camera Calibration" | A process to establish the transform between the Image and Calibrated Coordinate Spaces. |
| "Hand-eye Calibration" | A process, know to those of skill, to establish the transforms between the Image, the Calibrated, and the Motion Coordinate Spaces. |
| "all" cameras | Refers to all cameras that are used by the system in the assembly task herein. It is expressly contemplated that some cameras used by the vision system (or other processes), which may otherwise image the scene, can be omitted from the assembly task. It is contemplated mainly that one or more (at least one) camera(s) (which can be the same camera) image each location in the assembly and is/are calibrated to the common coordinate system space. |
| "operation" | Refers to a process performed on or with respect to the first workpiece at the first location, second location or a location at least partially remote from the first location and the second location. The operation can be (e.g.) an assembly operation with respect to a second workpiece, placing the first workpiece in a box or framework (i.e. kitting), or a modification to the first workpiece, such as printing, decal application, adhesive application, etc., using appropriate mechanisms |
| "first workpiece" | Refers to a part or other object used in actual runtime operation of the manipulator system (e.g. an assembly system) - also termed a "runtime workpiece". The first workpiece expressly excludes a calibration target/plate or other object used for system setup/training that is not part of a manufacturing or other runtime process, post-calibration and training. |
| "second workpiece" | Refers to a workpiece located at a second location to which the first workpiece is assembled based upon an alignment that can be achieved (e.g.) using a motion rendering device (motion stage) at either the first location or the second location. A second workpiece can also refer to a container (box) or framework into which the first workpiece is placed. |

Figure 2:
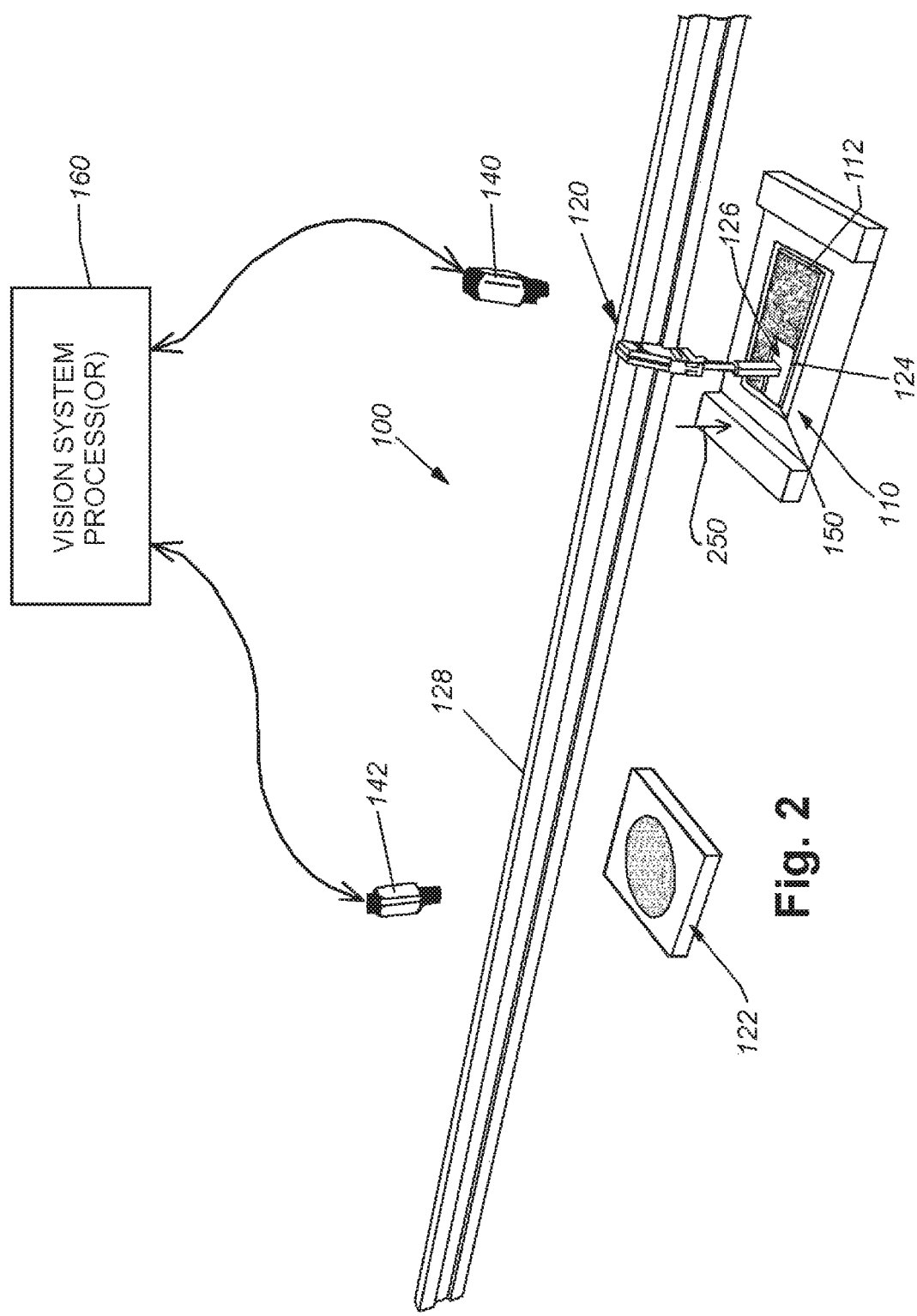
FIG. 2 is a diagram of a two-camera vision system arranged with respect to an exemplary pick-and-place assembly arrangement, in which a workpiece is in alignment with another workpiece, showing the pick-and-place manipulator located at the place location, and placing the first, picked workpiece on the second workpiece.

With reference briefly to FIG. 2, the manipulator 120 is shown having moved along the rail 180 from the first location 122 to the second location 110, with the first workpiece 124 in its gripper 150. The manipulator 120 is depicted accurately placing (arrow 250) the first workpiece 126 into the aligned receiving location 126 on the second workpiece 112. This alignment is established by the cameras 140, 142 and associated vision system process(or) 160 by moving the motion stage based on the common coordinate space. This common coordinate space is established during calibration by tying the calibrated coordinate space of each of the two locations 122, 110 together as now described below.

Figure 3:
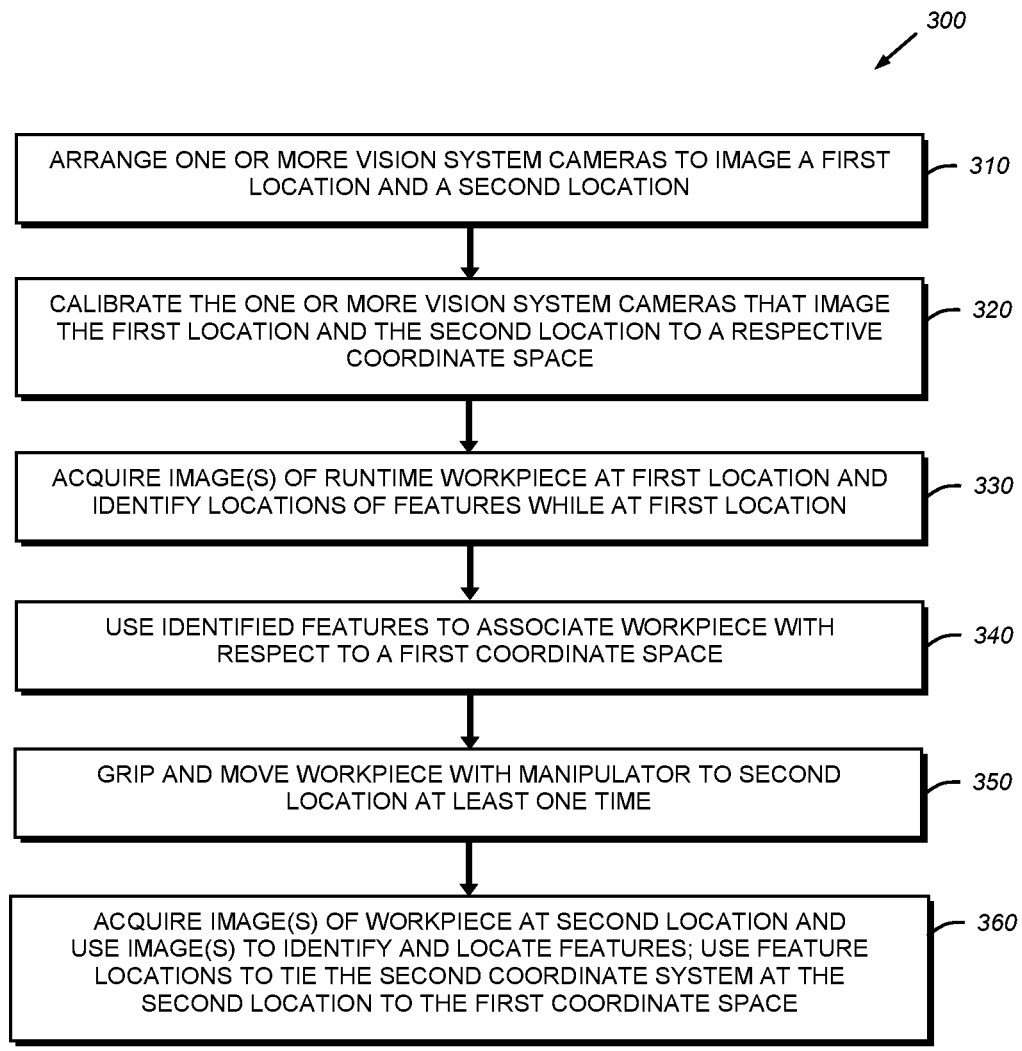
FIG. 3 is a flow diagram showing a generalized overview of a method for tying a first coordinate space at a first location to a second coordinate space at a second location based upon imaging of a runtime workpiece gripped by the manipulator at each location, in which the camera system is calibrated with respect to one of the locations.

By way of a general understanding of certain calibration principles, for a rigid body, such as a calibration target, a motion can be characterized by a pair of poses: a starting pose immediately preceding a motion, and an ending pose immediately following the motion—a "pose" herein being defined as a set of numerical values to describe the position and orientation of a body, at any one particular instant in time, in some underlying coordinate space—a virtual characterization of the body. For example, in two dimensions, a pose can be characterized by three numbers: a translation in X, a translation in Y, and a rotation R (or θ). A pose in the context of a calibration target describes how the calibration target is presented to the camera(s). Typically, in a standard so-called "hand-eye calibration", a calibration target is moved by a motion rendering device to a number of different poses with respect to the camera(s), and each camera acquires an image of the calibration target at each such pose. The goal of such hand-eye calibration is to determine the poses of the camera(s), the poses of the calibration target and the poses of the motion rendering device in a single coordinate space, which can be termed the "calibrated coordinate space". Typically, "motion" is provided by a physical device that can render physical motion, such as a robot arm, or a motion stage, or a gantry. Note that either the target can move relative to one or more stationary camera(s) or the camera(s) can move relative to a stationary target, such as when the cameras are mounted to the physical device providing motion. The controller of such a motion-rendering device employs numerical values (i.e. poses) to command the device to render any desired motion, and those values are interpreted in a native coordinate space for that device, termed herein the "motion coordinate space". With reference now to FIG. 3, an overall calibration process 300 for tying the coordinate spaces of two discrete locations (e.g. a pick and a place location) using a runtime workpiece moved by the manipulator between the locations is described. Notably, the use of a runtime workpiece avoids the disadvantages associated with use of a calibration target, and allows the user to conveniently employ the same structure that the manipulator is expected to handle in runtime operation. The process 300 begins in step 310 by arranging one or more cameras to image/acquire image(s) of a first location and a second location. The camera(s) view feature(s) of a runtime workpiece at each location—in which the features can be all, or in part, the same at each location, or different at each location. In step 320, the camera(s) viewing features at the first location or the second location are calibrated to a respective calibrated coordinate space. This can comprise hand-eye calibration by moving a calibration target by the stage and establishing the coordinate space based on such motion in association with motion information provided by the stage. Alternatively, this can comprise a calibration process that can be achieved using image(s) of a special calibration target such as the checker grid calibration plate, thus tying all the cameras at the location to the respective coordinate space. In step 330, images of the runtime workpiece are acquired by one or more camera(s) viewing the workpiece at the first location and the locations of features on the runtime workpiece are identified/extracted at the first location. The identified/extracted features are then used to associate the workpiece with respect to a first calibrated coordinate space—typically related to the first location in step 340. The features can be any identifiable visual elements on the workpiece, and in particular those that alone, or in combination uniquely define the orientation and location of the workpiece. Thus, where edges and corners are employed as identified features, such edges and corners can be unique to a certain location on the overall workpiece (e.g. a notch on one side of the workpiece). Feature extraction can be accomplished using various vision system tools (e.g. edge detectors, blob analyzers, etc.) 162 (FIG. 1) in accordance with skill in the art.

Figure 7:
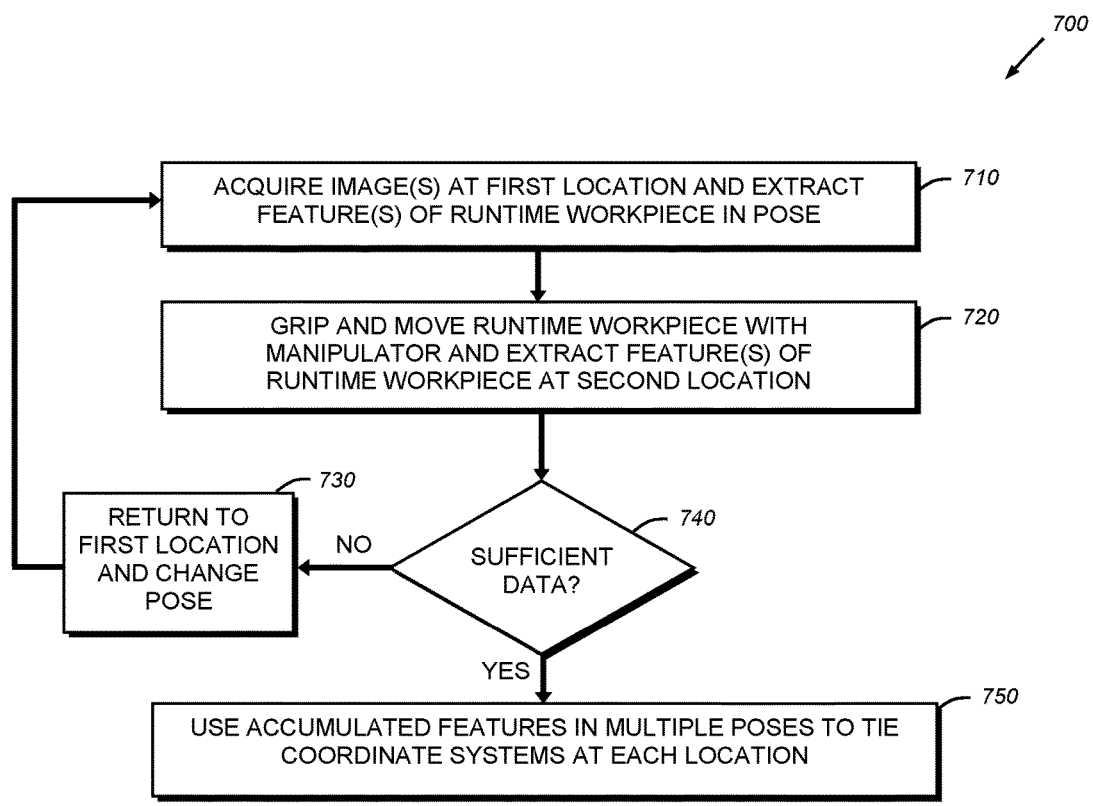
FIG. 7 is a flow diagram of an additional process relative to the methods of FIGS. 4 and 5 in which features are extracted at multiple unknown poses and the accumulated features are used to tie coordinate spaces at each location.

In step 350, the runtime workpiece is gripped by the manipulator (e.g. by application of a suction cup 125 to the runtime workpiece 124 in FIG. 1), and the workpiece is moved to the second location. This motion occurs at least one time (and can occur multiple times using different poses as described with reference to FIG. 7 below). Then, in step 360, the camera(s) at (viewing workpiece features in) the second location acquire(s) one or more images of the workpiece (in the image coordinate space, thereof). Features that are the same as those viewed at the first location, or that differ are used at the second location to find locations on the workpiece at the second location. Where the features are the same, the two coordinate spaces can be directly tied. Where the features different, a specification of the workpiece, such as a CAD drawing or measured representation/rendition (i.e. using a coordinate measuring machine CMM to measure the workpiece and store dimensions) allows the features at each location to be corresponded by the vision system calibration process. The corresponded features then allow each coordinate space to be tied together. Note that where one of the locations is hand-eye calibrated via step 320, the computed common coordinate space can be the same as the motion coordinate space of the motion stage.

Figure 4:
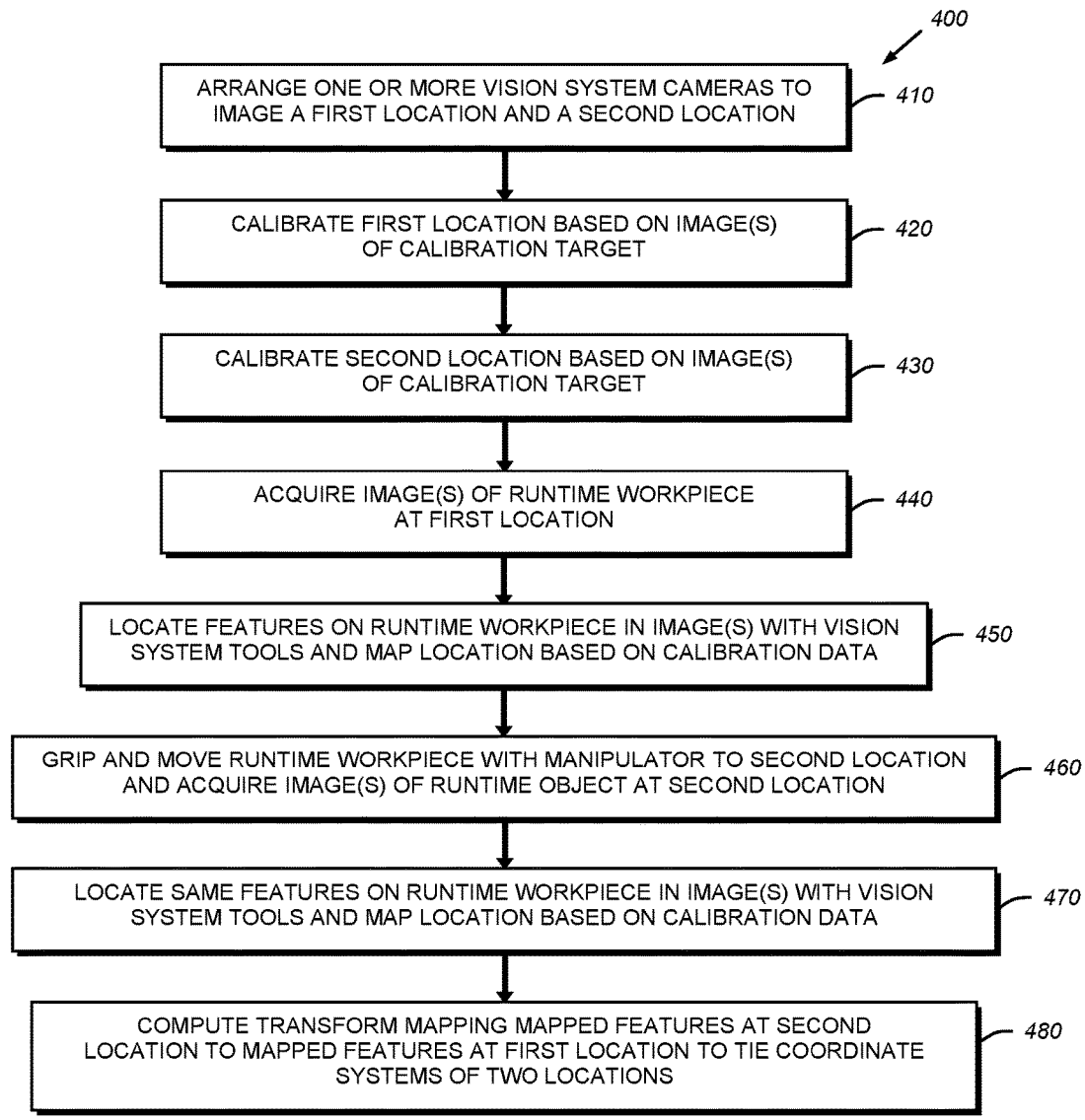
FIG. 4 is a more detailed flow diagram of the method generally described in FIG. 3 for tying the coordinate space of a first location to a coordinate space of a second location using features of runtime workpiece image(s) at each location, in which the features at each location are the same.
Figure 5:
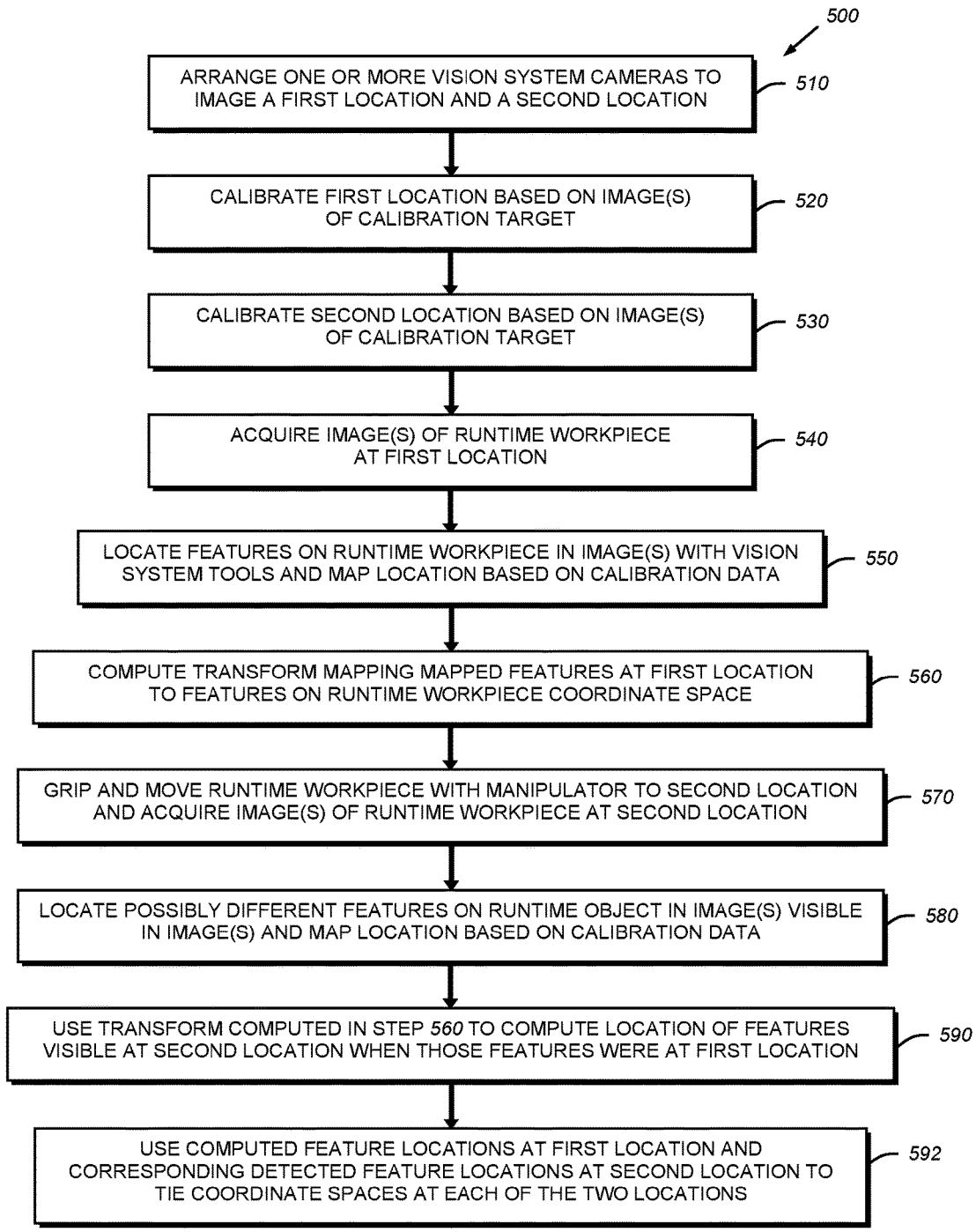
FIG. 5 is a more detailed flow diagram of the method generally described in FIG. 3 for tying the coordinate space of a first location to a coordinate space of a second location using features of runtime workpiece image(s) at each location, in which at least some of the features at each location are different due to visibility differences at each respective field of view.

FIGS. 4 and 5 are more detailed descriptions of two discrete methods/processes 400 and 500, respectively, for tying coordinate spaces together at the first location and the second location in accordance with the generalized process of FIG. 3. In FIG. 4, the process 400 includes step 410 in which one or more cameras are arranged to image two locations, one of which can include a motion stage. As described above, optional hand-eye calibration can be performed with the camera(s) viewing the location with a motion stage to establish the calibrated coordinate space. More generally, in steps 420 and 430, the camera(s) imaging the first and second locations can be calibrated using an appropriate calibration target. In step 440, the camera(s) acquire one or more images of the workpiece at the first location and the images are used to locate features, featuresImage1, on the workpiece using appropriate vision system tools (step 450). These features can be mapped to the calibrated coordinate space at the first location (features Calibrated1=Calibrated1FromImage1*featuresImage1).

The runtime workpiece is then gripped and moved by the manipulator to the second location. Where the camera(s) acquire image(s) of the runtime object (step 460). In this technique, the same features, featuresImage1 are also visible by the camera(s) at the second location, featuresImage2. In step 470, the camera(s) at the second location, thus, locates the same features on the runtime workpiece and the process 400 maps the locations based on the calibration data at the second location (featuresCalibrated2=Calibrated2From Image2*featuresImage2). Then, in step 480, the process 400 computes a transform, Calibrated1FromCalibrated2, mapping featuresCalibrated2 to the featuresCalibrated1 (from step 450). This transform is used to tie the coordinate spaces at the two locations together in accordance with the following relationship:

featuresCalibrated1=Calibrated1FromCalibrated2* featuresCalibrated2

If the location containing the stage has been optionally hand-eye calibrated, then the transform Calibrated1 From-Calibrated2 can be used in combination with the hand-eye calibration results to guide the assembly of the part during runtime.

In FIG. 5, the process 500 includes step 510 in which one or more cameras are arranged to image two locations, one of which can include a motion stage. As described above, optional hand-eye calibration can be performed with the camera(s) viewing the location with a motion stage to establish the calibrated coordinate space. In steps 520 and 530, the first and second locations can be calibrated using an appropriate calibration target. In step 540, the camera(s) acquire one or more images of the workpiece at the first location and the images are used to locate features on the workpiece, featuresImage1, using appropriate vision system tools. In step 550, these features can be mapped to the calibrated coordinate space at the first location, features-Calibrated1. In step 560 the process 500 computes a transform, WorkpieceFromCalibrated1, that maps workpiece features in the first calibrated coordinate space, features Calibrated1 (from step 550) at the first location to the stored workpiece coordinate space, in accordance with the following relationship:

featuresWorkpiece=WorkpieceFromCalibrated1*featuresCalibrated1

The workpiece coordinate space is established based upon a computer aided design (CAD) model of the workpiece that includes a representation of the feature parameters. Alternatively, the specification of the runtime workpiece coordinate space can be established by physical measurement of the workpiece—for example using a coordinate measuring machine (CMM) in accordance with ordinary skill. Parameters are stored for use by the mapping process.

The runtime workpiece is then gripped and moved by the manipulator to the second location. Where the camera(s) acquire image(s) of the runtime object (step 570). In this technique, one or more of the features viewed at the second location could differ from those features viewed/imaged at the first location. This can result when the same features are not visible to the camera(s) at both locations due to obstructions, the field of view (FOV) of the camera(s), etc. In step 580, the camera(s) at the second location, locate the visible features, featVisIn2Image2, on the runtime workpiece and the locations are mapped (feat VisIn2Calibrated2= Calibrated2 FromImage2*featVisIn2Image2) based on the calibration data at the second location. The corresponding points in the workpiece coordinate space are found, featVisIn 2Workpiece. Then, in step 590, the process 500 uses the inverse transform WorkpieceFromCalibrated1 from step 560 to compute the location of features visible at the second location in the first calibrated space when such features were at the first location:

featVisIn2Calibrated1=Calibrated1FromWorkpiece*
featVisIn2Workpiece

In step 592, the computed feature locations from the first location and the corresponding detected feature locations at the second location are used to tie the coordinate spaces together at each of the locations in accordance with the following relationship:

featVisIn2Calibrated1=Calibrated1FromCalibrated2*
featVisIn2Calibrated2

If the location containing the stage has been hand-eye calibrated, then the transform Calibrated1FromCalibrated2 can be used in combination with the hand-eye calibration results to guide the assembly of the part during runtime.

Note, in various embodiments, it is expressly contemplated that the mapping from the image coordinate space to calibration coordinate space at the first location can be equal to unity. This technique accommodates arrangements in which the second location is calibrated, and the image features at the first location are mapped to the calibration coordinate space at the second location as described in FIGS. 3-5.

Figure 6:
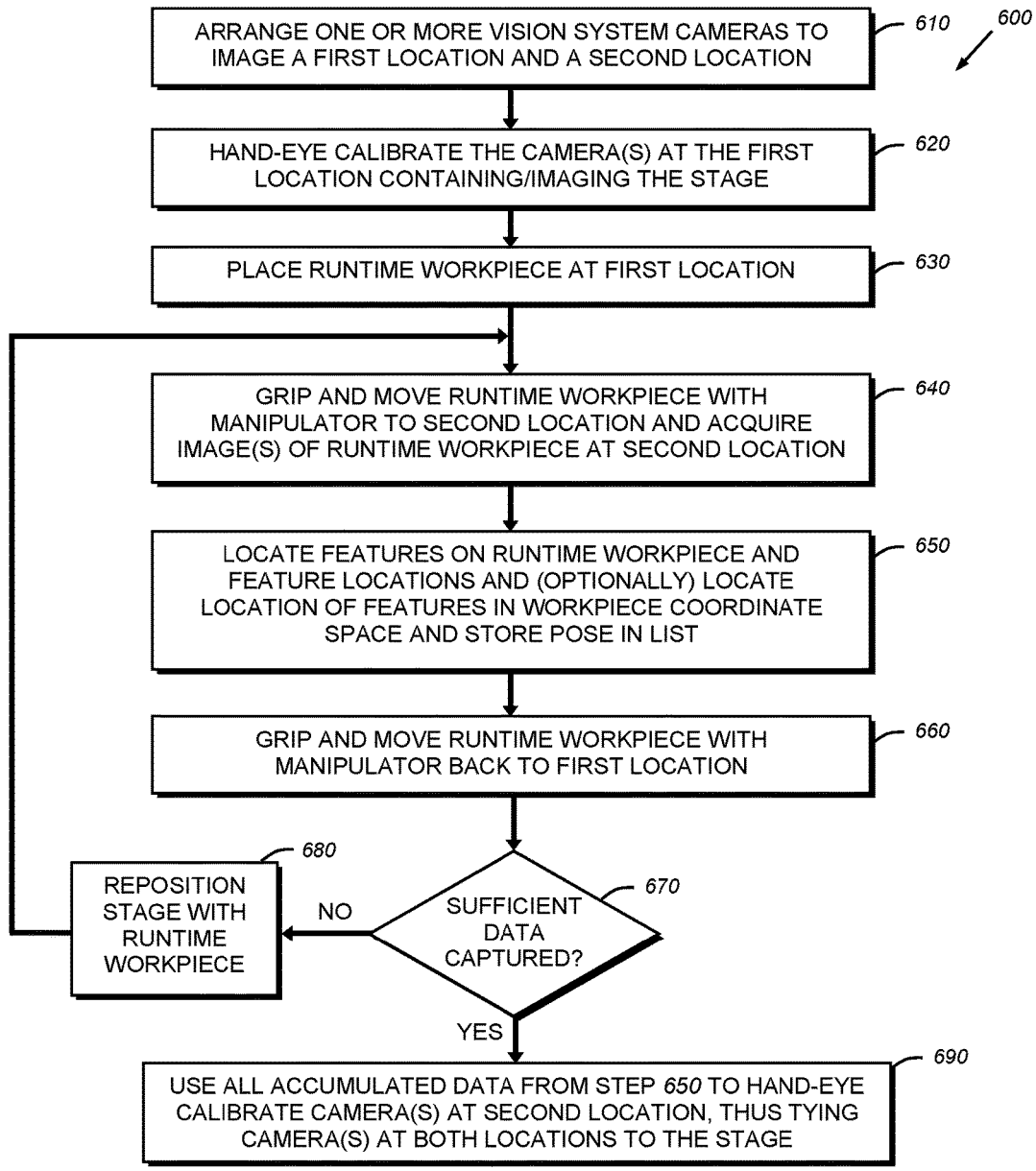
FIG. 6 is a flow diagram of a method for tying the coordinate space of a first location to a coordinate space of a second location by performing separate hand-eye calibrations at the first location and the second location.

FIG. 6 details a method/process 600 according to anther contemplated technique for tying the coordinate spaces of two discrete locations together, in which both the first location camera(s) and the second location camera(s) are free of calibration. In this arrangement it is contemplated that each location can be hand-eye calibrated separately, both locations being tied to the same common coordinate space relative to the motion stage. In step 610, the camera(s) are arranged to image each location. The location (i.e. first location) containing the motion stage is hand-eye calibrated in step 620. The runtime workpiece is then placed at the stage-containing first location in step 630. The runtime workpiece is then gripped and moved to the second location in step 640, where one or more images are acquired with the camera(s). Features on the workpiece are located in step 650. Optionally if the CAD or CMM specification of the workpiece is available, such features can be corresponded with respect to a CAD or CMM representation of the workpiece coordinate space. The pose derived from the features is stored in a list X11. The workpiece is again gripped and moved back to the first/stage location in step 660. The steps 640, 650 and 660 are repeated as the stage is moved to establish new poses with each iteration (step 680) until sufficient data is captured and stored in the list X11. The process 600, then proceeds (via decision step 670) in step 690 to use the accumulated data from step 650 (list X11) to hand-eye calibrate the camera(s) at the second location. The camera calibrated coordinate spaces at both locations are, thus, tied together by the common coordinate space relative to the motion stage.

The methods/processes 400 and 500 (steps 450, 470 in FIG. 4 and steps 550 and 580 in FIG. 5) can be enhanced by performing feature extraction from the runtime workpiece iteratively. An overview of this enhanced process 700 is described in FIG. 7. In step 710, one or more images are acquired of the runtime workpiece at the first location, and features are extracted/identified. The workpiece is then gripped and moved by the manipulator in step 720, and features are extracted/identified (either the same or different features as described above). The manipulator either returns the workpiece to the first location iteratively, roughly changing the pose each time (step 730) or transfers multiple instances of the workpiece with a roughly different pose. That is, the accuracy and robustness of the calibration can be enhanced through multiple iterations of feature extraction and accumulation on either the same workpiece of a series of different workpieces that are each run through a motion cycle between locations. During each iteration, features from images at the first location and the second location are extracted via steps 710 and 720 until sufficient feature data is obtained. This threshold can be based on a set number of iterations or another metric. The process 700 then proceeds (via decision step 740) to step 750 where the accumulated feature data from multiple poses is used to tie the coordinate spaces at each location together as described generally above.

It should be clear that the above-described techniques for tying the coordinate spaces at two discrete locations in an assembly process together using a runtime workpiece avoids disadvantages associated with use of a calibration target. These techniques allow for flexibility in the manner in which cameras are arranged with respect to each location. These techniques also allow for enhanced/refined accuracy through iteration of various steps, such as feature extraction. These techniques also avoid the disadvantages of the above-described prior techniques, which rely on either a known mechanical arrangement or an iterative trial and error approach.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, as used herein the terms "process" and/or "processor" should be taken broadly to include a variety of electronic hardware and/or software based functions and components (and can alternatively be termed functional "modules" or "elements"). Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor herein can be implemented using electronic hardware, software consisting of a non-transitory computer-readable medium of program instructions, or a combination of hardware and software. Additionally, as used herein various directional and orientational terms such as "vertical", "horizontal", "up", "down", "bottom", "top", "side", "front", "rear", "left", "right", and the like, are used only as relative conventions and not as absolute orientations with respect to a fixed coordinate space or system, such as the acting direction of gravity. Illustratively, one location includes a location stage, but it is contemplated that multiple locations can include stages—for example where a first motion stage moves the workpiece along one axis and the second stage moves the workpiece along another orthogonal axis (or a rotation not provided by the first stage). Accordingly, this description is meant to be taken only by way of example, and not to otherwise limit the scope of this invention.

What is claimed is:

1. A method for calibrating a vision system in an environment in which a first workpiece at a first location is transferred by a manipulator to a second location, wherein an operation performed on the first workpiece relies upon tying together coordinate spaces of the first location and the second location, the method comprising the steps of:
    arranging at least one vision system camera to image the first workpiece when positioned at the first location and to image the first workpiece when positioned at the second location;
    calibrating at least one vision system camera with respect to the first location to derive first calibration data which defines a first coordinate space and at least one vision system camera with respect to the second location to derive second calibration data which defines a second coordinate space;
    identifying features of at least the first workpiece at the first location from a first image of the first workpiece;
    based on the identified features in the first image locating the first workpiece with respect to the first coordinate space relative to the first location;
    gripping and moving, with the manipulator, at least one time, the first workpiece to a predetermined manipulator position at the second location;
    acquiring a second image of the first workpiece at the second location; and
    based upon the identified features in the second image, locating the first workpiece with respect to the second coordinate space relative to the second location and tying together the first coordinate space and the second coordinate space.

2. The method as set forth in claim 1 wherein the identified features in the first image are the same as the identified features in the second image, and further comprising (a) mapping locations of the identified features in the first image with respect to the first calibration data, (b) mapping locations of the identified features in the second image with respect to the second calibration data, and (c) computing a transform mapping the mapped features at the second location to the mapped features at the first location.

3. The method as set forth in claim 1 wherein some of the identified features in the first image differ from the identified features in the second image, and further comprising (a) mapping locations of the identified features in the first image with respect to the first calibration data, (b) computing a transform relative to a stored specification of feature locations of the first workpiece, (c) mapping locations of the identified features in the second image with respect to the second calibration data, (d) using the transform computed in step (b) to derive locations of the identified features from the second image in the first coordinate space when the first workpiece is located at the first location, and (e) computing a transform mapping the mapped features at the second location to the corresponding transformed features at the first location.

4. The method as set forth in claim 3 wherein the stored specification is based upon a CAD model of the first workpiece.

5. The method as set forth in claim 3 wherein the stored specification is based upon a measured model of the first workpiece.

6. The method as set forth in claim 1 further comprising (a) moving the first workpiece iteratively with a motion rendering device at either the first location or the second location to a plurality of different poses, (b) identifying features at each of the poses at each of the first location and the second location and (c) accumulating the identified feature information to enhance accuracy, wherein the first workpiece is either the same workpiece or is one of a plurality of discrete workpieces.

7. The method as set forth in claim 1 further comprising providing a mapping from an image coordinate system to a calibration coordinate system at the first location, and wherein the mapping is unity.

8. The method as set forth in claim 1 wherein the second location has a second workpiece into which the first workpiece is placed into engagement in a desired alignment with the second workpiece.

9. The method as set forth in claim 8 wherein the second workpiece is a part, a container or a framework for further processing of the first workpiece.

10. The method as set forth in claim 1 wherein the operation is at least one of an alignment operation with respect to another object, a printing operation on the first workpiece, and an application operation on the first workpiece.

11. The method as set forth in claim 10 wherein the operation is performed at least in part at a location remote from the first location and the second location.

12. A method for calibrating a vision system in an environment in which a first workpiece at a first location is transferred by a manipulator to a second location, wherein an operation performed on the first workpiece relies upon tying together coordinate spaces of the first location and the second location, the method comprising the steps of:

(a) arranging at least one vision system camera to image the first workpiece at the first location and to image the second location;

(b) hand-eye calibrating at least one vision system camera with respect to the first location to derive first calibration data;

(c) positioning the first workpiece at the first location;

(d) moving the first workpiece from the first location to the second location;

(e) acquiring an image and locating features on the first workpiece;

(f) moving the first workpiece to the first location from the second location and changing a pose of the first workpiece at the first location by moving the motion rendering device to a new known pose;

(g) iterating steps (d-f) until feature location and other data relevant to hand-eye calibration is accumulated; and (h) using the accumulated data to hand-eye calibrate at least one vision system camera with respect to the second location, and tying together the first coordinate space and the second coordinate space by the common coordinate space relative to the motion rendering device obtained from the hand-eye calibration.

13. The method as set forth in claim 12 wherein the second location has a second workpiece on the motion rendering device into which the first workpiece is placed into engagement in a desired alignment with the second workpiece.

14. The method as set forth in claim 13 wherein the second workpiece is a part, a container or a framework for further processing of the first workpiece.

15. The method as set forth in claim 12 wherein the operation is at least one of an alignment operation with respect to another object, a printing operation on the first workpiece, and an application operation on the first workpiece.

16. A system for calibrating a vision system in an environment in which a first workpiece at a first location is transferred by a manipulator to a second location, wherein an operation performed on the first workpiece relies upon tying together coordinate spaces of the first location and the second location, comprising:

at least one vision system camera arranged to image the first workpiece when positioned at the first location and to image the first workpiece when positioned at the second location;

a calibration process that calibrates at least one vision system camera with respect to the first location to derive first calibration data and the at least one vision system camera with respect to the second location to derive second calibration data;

a feature extraction process that identifies features of at least the first workpiece at the first location from a first image of the first workpiece, and based on the identified features in the first image, that locates the first workpiece with respect to a first coordinate space relative to the first location, and based upon the identified features in a second image at a second location, that locates the first workpiece with respect to a second coordinate space relative to the second location; and a calibration process that ties together the first coordinate space and the second coordinate space.

17. The system as set forth in claim 16 wherein the second location has a second workpiece into which the first workpiece is placed into engagement in a desired alignment with the second workpiece.

18. The system as set forth in claim 16 wherein some of the identified features in the first image differ from the identified features in the second image, and wherein the calibration process is constructed and arranged to (a) map locations of the identified features in the first image with respect to the first calibration data, (b) compute a transform relative to a stored specification of feature locations of the first workpiece, (c) map locations of the identified features in the second image with respect to the second calibration data, (d) using the transform computed in step (b) derive locations of the identified features from the second image in the first coordinate space when the first workpiece is located at the first location, and (e) compute a transform mapping the mapped features at the second location to the corresponding transformed features at the first location.

19. The system as set forth in claim 18 wherein the stored specification is based upon either a CAD model of the first workpiece or a measured model of the first workpiece.

20. The system as set forth in claim 16 wherein the second location has a second workpiece into which the first workpiece is placed into engagement in a desired alignment with the second workpiece.

* * * * *